United States Patent
Hoiss et al.

(10) Patent No.: US 9,841,095 B2
(45) Date of Patent: Dec. 12, 2017

(54) VEHICLE, HAVING AN INTERNAL COMBUSTION ENGINE WHICH COMPRISES A FLEXIBLE DRIVE

(71) Applicant: Bayerische Motoren Werke Aktiengesellschaft, Munich (DE)

(72) Inventors: Franz Hoiss, Bernried (DE); Markus Zimmermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 116 days.

(21) Appl. No.: 14/934,681

(22) Filed: Nov. 6, 2015

(65) Prior Publication Data

US 2016/0061311 A1 Mar. 3, 2016

Related U.S. Application Data

(63) Continuation of application No. PCT/EP2014/057845, filed on Apr. 17, 2014.

(30) Foreign Application Priority Data

May 7, 2013 (DE) ........................ 10 2013 208 327

(51) Int. Cl.
*F16H 55/36* (2006.01)
*B60R 21/00* (2006.01)
(Continued)

(52) U.S. Cl.
CPC ............ *F16H 55/36* (2013.01); *B22F 3/1055* (2013.01); *B22F 5/08* (2013.01); *B60R 21/00* (2013.01);
(Continued)

(58) Field of Classification Search
CPC . F16H 55/36; B60R 21/00; B60R 2021/0004; B22F 3/1055; B22F 5/08; F02B 67/06
See application file for complete search history.

(56) References Cited

U.S. PATENT DOCUMENTS 4,231,265 A 11/1980 Hanisch et al.
4,309,970 A * 1/1982 Sorsche ................. B60K 25/02
123/195 A
(Continued)

FOREIGN PATENT DOCUMENTS

CN 1148557 A 4/1997
DE 26 55 909 A1 6/1978
(Continued)

OTHER PUBLICATIONS

International Search Report (PCT/ISA/210) issued in PCT Application No. PCT/EP2014/057845 dated Jul. 18, 2014, with English translation (four (4) pages).
(Continued)

*Primary Examiner* — Jacob Amick
(74) *Attorney, Agent, or Firm* — Crowell & Moring LLP

(57) ABSTRACT

A vehicle having an internal combustion engine mounted in the vehicle such that a crankshaft of the internal combustion engine runs in a longitudinal direction of the vehicle is provided with a flexible drive is provided that comprises a wheel, in particular a pulley, which is arranged such as to rotate about a longitudinal axis of the vehicle and which is arranged in front of the internal combustion engine when viewed in the direction of travel of the vehicle. The wheel has at least one weakened section which allows or facilitates a compression of the wheel in the longitudinal direction of the vehicle upon a head-on collision. In addition, the wheel may be arranged to cooperate with a recess in the front of the engine to permit further displacement of the wheel toward the engine during a collision.

8 Claims, 3 Drawing Sheets

(51) Int. Cl.
*B22F 5/08* (2006.01)
*F02B 67/06* (2006.01)
*B22F 3/105* (2006.01)
*B22F 5/00* (2006.01)

(52) U.S. Cl.
CPC ........ *F02B 67/06* (2013.01); *B22F 2005/005* (2013.01); *Y02P 10/295* (2015.11)

(56) References Cited

U.S. PATENT DOCUMENTS

| | | |
|---|---|---|
| 4,439,172 A | 3/1984 | Segawa |
| 2005/0000482 A1 | 1/2005 | Leweux et al. |
| 2006/0140767 A1* | 6/2006 | Garman ................ B22F 3/105 416/182 |

FOREIGN PATENT DOCUMENTS

| | | |
|---|---|---|
| DE | 199 39 813 A1 | 2/2001 |
| DE | 10 2007 048 385 B3 | 1/2009 |
| GB | 2 407 342 A | 4/2005 |

OTHER PUBLICATIONS

German Office Action issued in counterpart German Application No. 10 2013 208 327.0 dated Feb. 7, 2014 (five (5) pages).
Chinese Office Action issued in counterpart Chinese Application No. 201480016239.6 dated Sep. 1, 2016, with English translation (ten (10) pages).

* cited by examiner

VEHICLE, HAVING AN INTERNAL COMBUSTION ENGINE WHICH COMPRISES A FLEXIBLE DRIVE

CROSS REFERENCE TO RELATED APPLICATIONS

This application is a continuation of PCT International Application No. PCT/EP2014/057845, filed Apr. 17, 2014, which claims priority under 35 U.S.C. §119 from German Patent Application No. 10 2013 208 327.0, filed May 7, 2013, the entire disclosures of which are herein expressly incorporated by reference.

BACKGROUND AND SUMMARY OF THE INVENTION

The present invention relates to a vehicle having an internal combustion engine, and in particular to a flexible drive of the engine.

Vehicles having a longitudinally installed internal combustion engine, i.e. having an internal combustion engine, the crankshaft of which extends in a longitudinal direction of the vehicle, have a flexible drive, normally designed as a belt drive, in front of the internal combustion engine. The belt drive is driven by a belt pulley which, in turn, is driven by the crankshaft of the internal combustion engine.

For reasons of design, there is an effort to keep the "overhang" of the vehicle front structure, i.e. the distance between the front wheels and the forwardmost point of the vehicle, as short as possible. In this design requirement, there is a certain conflict of aims with the "crumple zone" required from the point of view of design for collisions, which should be as long as possible. In a head-on or frontal collision in which the front structure is compressed, the belt pulley generally becomes a single block with the engine block of the internal combustion engine.

It is the object of the invention to provide a vehicle, having an internal combustion engine and a flexible drive, which has a sufficiently large crumple zone, even in the case of a relatively short overhang.

The starting point of the invention is a vehicle having an internal combustion engine, which is installed in the vehicle in such a way that a crankshaft of the internal combustion engine extends in a longitudinal direction of the vehicle.

The internal combustion engine has a flexible drive, which has a (driving) wheel, in particular a belt pulley, which is arranged in such a way as to rotate about a longitudinal axis of the vehicle. The wheel or belt pulley is arranged in front of the internal combustion engine when viewed in the direction of travel of the vehicle. A flexible drive of this kind is used to drive auxiliary units of the internal combustion engine, e.g. a generator or a mechanically driven refrigerant compressor.

The wheel of the flexible drive has at least one "weakened section", which is provided for the purpose of facilitating compression of the wheel (or belt pulley) in a collision, the wheel or belt pulley thus forming a part of the "crumple zone" of the front structure.

The at least one weakened section is thus used to ensure that, in a head-on collision of the vehicle, compression of the wheel in the longitudinal direction of the vehicle is allowed or facilitated. In contrast to conventional belt pulleys, which act as a virtually incompressible or hardly compressible "block" in a collision, the wheel according to the invention can be compressed at least by a few millimeters or a few centimeters, thereby extending the crumple zone of the vehicle front structure accordingly.

The wheel of the flexible drive can be produced by laser sintering, for example. That is to say, it can be a laser-sintered component. As regards their geometry, laser-sintered components can have a design of almost any degree of complexity and can be provided with recesses, undercuts or the like. Laser-sintered components offer many different ways of producing weakened sections. However, the wheel does not necessarily have to be a laser-sintered part. It can also be a casting or a turned component.

For example, weakened sections spaced apart in the circumferential direction can be provided in the wheel. The weakened sections can be designed as slots, for example. The slots can take the form of rectangles, for example. At the same time, provision can be made for the length of the slots in the longitudinal direction of the vehicle to be greater than the slot width in the circumferential direction of the wheel.

According to a development of the invention, the wheel is secured on a flywheel of the internal combustion engine. The wheel can be screwed to the flywheel, for example.

Moreover, provision can be made for the flywheel to have a groove-type depression, which can take the form of a full circle, for example. By means of a groove-type depression, a further crumple zone of several millimeters can be kept in reserve. In a head-on collision, the front side of the wheel circumference can be deflected into the groove or be deformed into the groove.

As an alternative or in addition, a "splitting element" can be provided. A "splitting element" is taken to be an element which splits the circumference of the wheel in the longitudinal direction of the vehicle at at least one point or at several points in a head-on collision of the vehicle.

In a side view of the belt pulley, the splitting element can be of "mushroom-like" design. A "shank portion" of the splitting element can be arranged concentrically with respect to the axis of rotation of the wheel. The splitting element furthermore has a "head portion". At least one cutting-edge-type element, which penetrates into the circumferential segment of the wheel and splits the latter in a head-on collision, can be provided on an underside of the head portion of the splitting element, said underside facing the wheel. A plurality of such cutting-edge-type elements distributed in the circumferential direction can preferably be provided. For example, four cutting-edge-type elements, each spaced apart by 90° in the circumferential direction, can be provided.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
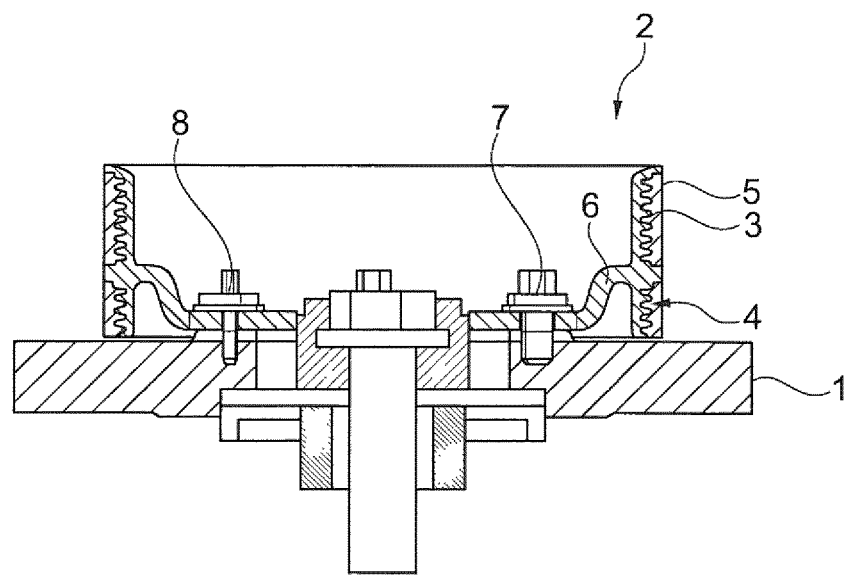
FIG. 1 shows a belt pulley in accordance with the prior art.

FIG. 1 shows a conventional belt pulley 1 of an auxiliary unit drive of an internal combustion engine, having a flywheel 1, which is driven by the crankshaft of the internal combustion engine and to which a belt pulley 2 is screwed. The belt pulley 2 has a circumferential or lateral surface 4, which is provided with profiling 3 and on which a belt 5 of an auxiliary unit drive (not shown specifically here) is mounted. A base 6 connected to the circumferential or lateral surface 4 is screwed to the flywheel 1 by screws 7, 8.

Figure 2:
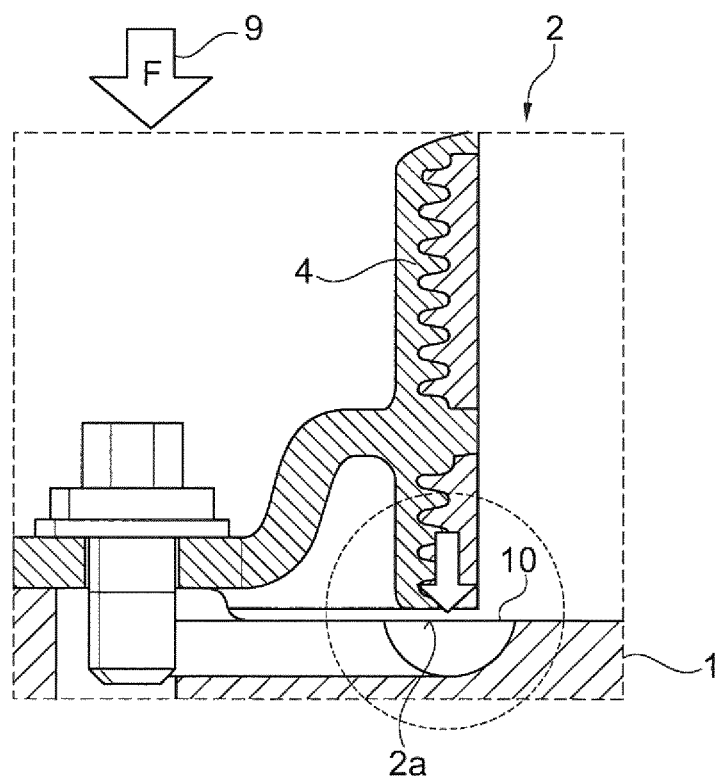
FIG. 2 shows a belt pulley screwed to a flywheel, wherein a groove-type depression is provided on the flywheel in accordance with an embodiment of the present invention.
Figure 3:
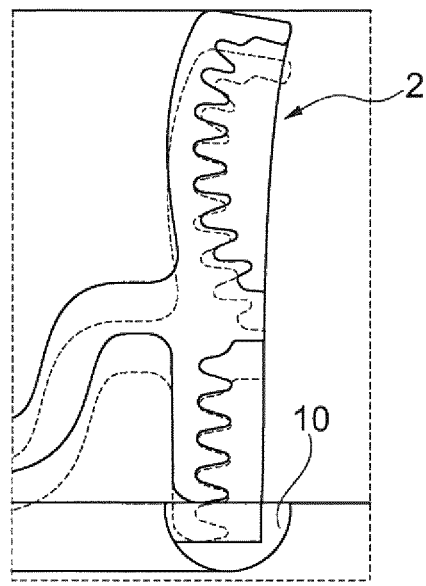
FIG. 3 shows the belt pulley of FIG. 2 in a collision.

In a head-on collision of the vehicle, the belt pulley 2 is compressed in the vehicle longitudinal direction, this being indicated in FIG. 2 by an arrow 9. In order to achieve as large as possible a crumple zone, a semicircular groove-type depression 10, which extends over a full circle in the flywheel 1, is provided in the flywheel 1 in the illustrative embodiment shown in FIG. 2. During a deformation of the belt pulley 2, a front side 2a of the belt pulley 2 can deform into the groove-type depression 10, this being illustrated in FIG. 3. The depth of the groove-type depression 10 thus represents an additional crumple zone.

Figure 4:
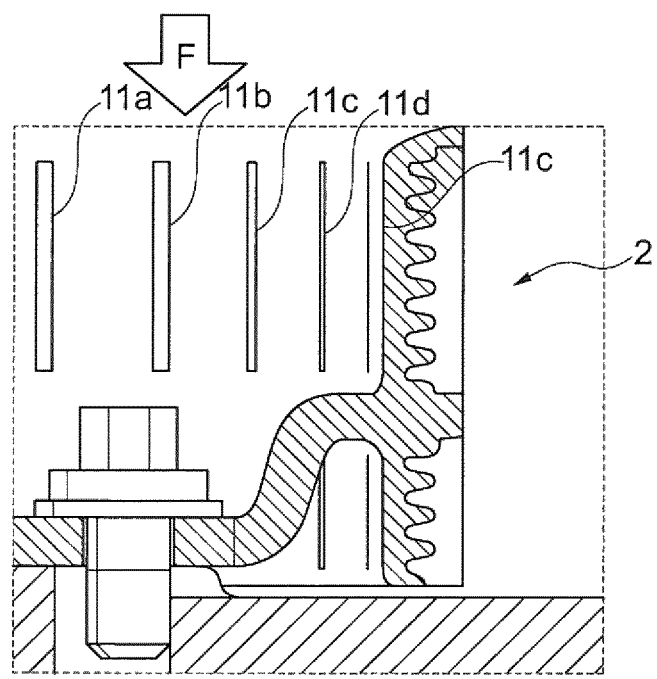
FIG. 4 shows a belt pulley in accordance with an embodiment of the present invention having axial slots.

A deformation of the belt pulley 2 can be additionally assisted by slots 11a-11e provided in the belt pulley 2. As can be seen from FIG. 4, the slots 11a-11e extend in the vehicle longitudinal direction or parallel to the axis of rotation of the belt pulley 2. The slots 11a-11e are arranged spaced apart in the circumferential direction of the belt pulley 2.

Of course, the slots 11a-11e can be combined with a groove-type depression 10 provided in the flywheel 1, thereby making it possible to achieve a larger crumple zone overall.

Figure 5:
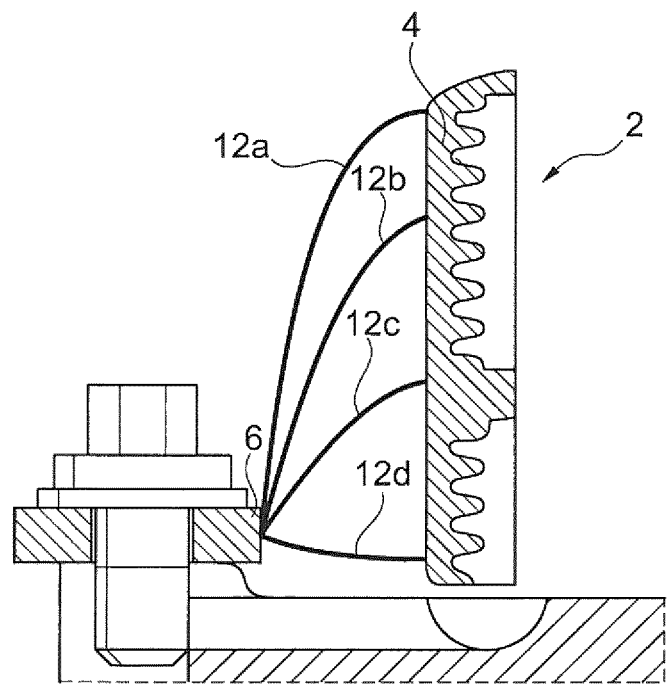
FIG. 5 shows a laser-sintered belt pulley in accordance with an embodiment of the present invention.

FIG. 5 shows an illustrative embodiment of a belt pulley 2 which has a very complex geometry, having a circumferential or lateral surface 4 which is connected to the base 6 of the belt pulley by a plurality of ribs 12a, 12b, 12c, 12d. Such a complex belt pulley geometry can be produced by laser sintering, for example. The belt pulley 2 can be sintered from a metal powder or from a metal-containing powder, for example.

Figure 6:
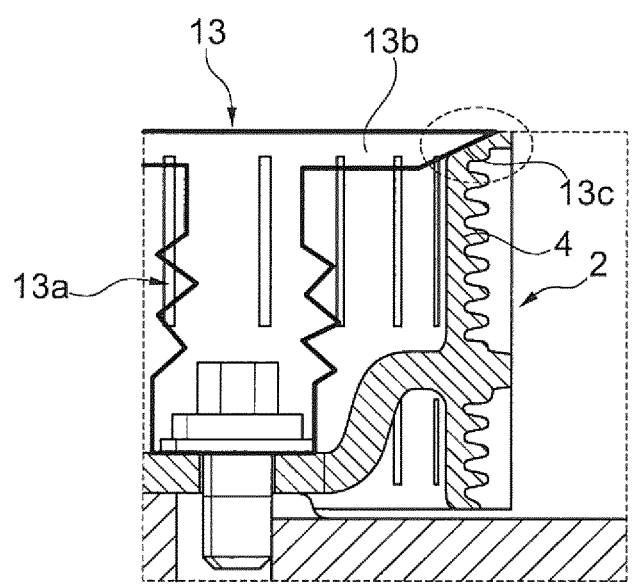
FIG. 6 shows a belt pulley in accordance with an embodiment of the present invention having a splitting element.

FIG. 6 shows an illustrative embodiment in which a mushroom-shaped splitting element 13 is provided in addition to the belt pulley 2. The splitting element 13 has a shank portion 13a and a head portion 13b. The shaft portion 13a, which is represented by zigzag lines, is made relatively soft when considered in the longitudinal direction of the vehicle, i.e. in the direction of rotation of the belt pulley 2. In a head-on collision of the vehicle, the shank portion 13a can thus be compressed relatively easily. The head portion 13b has cutting-edge-type elements 13c spaced apart by 90° in the circumferential direction, e.g. four such elements. If the splitting element 13 is compressed in a head-on collision, the cutting-edge-type elements 13c penetrate into the circumferential or lateral surface segment 4 of the belt pulley and split the latter. As a result, compression of the belt pulley 2 is additionally assisted in a collision.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   an internal combustion engine having a crankshaft extending in a longitudinal direction of the vehicle,
   a flexible drive having a wheel arranged to rotate about a longitudinal axis of the vehicle at a front end of the internal combustion engine,
   wherein
   the wheel has at least one weakened section arranged to facilitate a compression of the wheel in the longitudinal direction of the vehicle in a frontal collision of the vehicle, and
   the at least one weakened section is a plurality of weakened sections spaced apart in a circumferential direction of the wheel.

2. The vehicle as claimed in claim 1, wherein the wheel is a laser-sintered component.

3. The vehicle as claimed in claim 1, wherein the plurality of weakened sections are formed by slots.

4. The vehicle as claimed in claim 3, wherein the slots have a length in the longitudinal direction of the vehicle which is greater than a width of the slots in the circumferential direction of the wheel.

5. The vehicle as claimed in claim 1, wherein the wheel is secured on a flywheel of the internal combustion engine.

6. The vehicle as claimed in claim 5, wherein the flywheel has a circular depression configured to receive at least one of a circumferential and a lateral surface segment of the wheel in the frontal collision of the vehicle.

7. The vehicle as claimed in claim 1, further comprising:
   a splitting element configured to split at least one of a circumferential and a lateral surface segment of the wheel in the longitudinal direction of the vehicle at at least one point on the at least one circumferential and lateral surface segment in a frontal collision.

8. The vehicle as claimed in claim 7, wherein the splitting element includes a shank portion extending concentrically with respect to an axis of rotation of the wheel and at least one cutting-edge element configured to penetrate into the at least one circumferential and lateral surface segment of the wheel in a frontal collision provided on an underside of a head portion of the splitting element facing the wheel.

* * * * *